United States Patent [19]

White et al.

[11] Patent Number: 5,115,750
[45] Date of Patent: May 26, 1992

[54] SUBSOIL TREATMENT APPARATUS

[76] Inventors: James S. White; Mark S. White, both of c/o Whites Farmers, Manor Farm, Thorpe Salvin, Worksop S80 3JN, England

[21] Appl. No.: 618,663

[22] Filed: Nov. 27, 1990

[30] Foreign Application Priority Data

Nov. 28, 1989 [GB] United Kingdom ............... 8926851

[51] Int. Cl.⁵ .................... A01B 45/02; A01C 15/00
[52] U.S. Cl. ........................ 111/118; 172/21; 111/89
[58] Field of Search ............ 111/89, 118, 119, 129; 172/1, 21

[56] References Cited

U.S. PATENT DOCUMENTS

| | | | |
|---|---|---|---|
| 3,029,756 | 4/1962 | Krivda | 111/118 |
| 4,566,543 | 1/1986 | Kotani | 111/118 X |
| 4,624,194 | 12/1983 | Zinck | 111/7.2 |
| 4,658,738 | 10/1985 | Zinck | 111/7.2 |
| 4,660,480 | 9/1985 | Zinck | 111/7 |
| 4,850,291 | 3/1988 | Masuko et al. | 111/7.2 |
| 4,903,618 | 2/1990 | Blair | 111/118 |

FOREIGN PATENT DOCUMENTS

| | | |
|---|---|---|
| 0106308 | 4/1984 | European Pat. Off. |
| 0128173 | 12/1984 | European Pat. Off. |
| 0134350 | 3/1985 | European Pat. Off. |
| 0198589 | 10/1986 | European Pat. Off. |
| 1052149 | 3/1959 | Fed. Rep. of Germany |
| 3419530 | 5/1985 | Fed. Rep. of Germany |
| 2550416 | 2/1985 | France |
| 2572241 | 5/1986 | France |
| 356300 | 8/1961 | Switzerland ............ 111/6 |
| 2144961 | 3/1985 | United Kingdom |

Primary Examiner—Dennis L. Taylor
Assistant Examiner—Jeffrey L. Thompson
Attorney, Agent, or Firm—Trexler, Bushnell, Giangiorgi & Blackstone, Ltd.

[57] ABSTRACT

Subsoil treatment apparatus (1) comprises an impact striking head (2) associated with one end (3) of an impact transmission block (4) which has an internal chamber (5) connectable to a source of compressed air, and a hollow, tubular, ground-piercing spike (6) projecting from an opposite end (7) of the block (4) and to which impacts are transmitted from the block (4), the end (8) of the spike (6) associated with the block (4) being in air flow communication with the chamber (5), and the opposite end (9) of the spike (6) being provided with at least one air discharge aperture (10). The invention also includes a truck (28) carrying multiple apparatus (1).

18 Claims, 2 Drawing Sheets

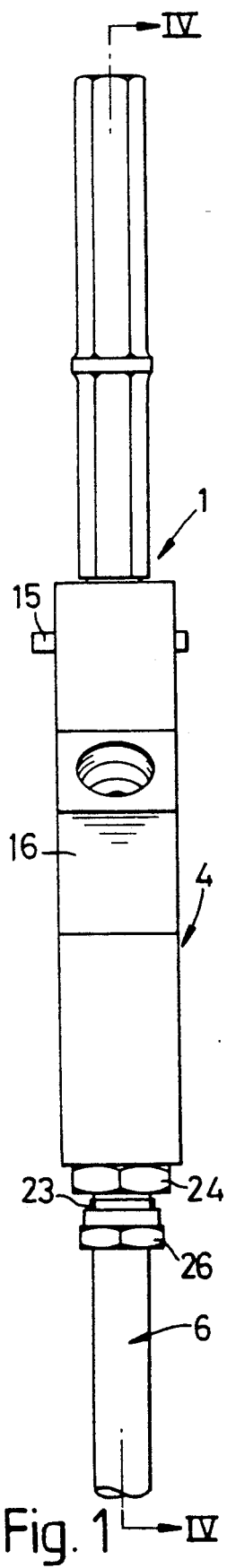
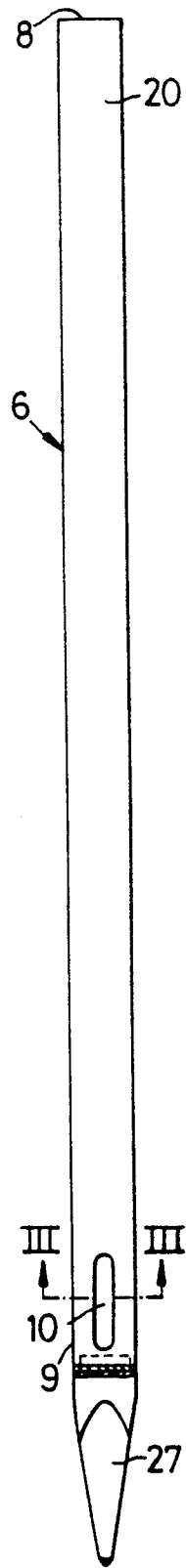
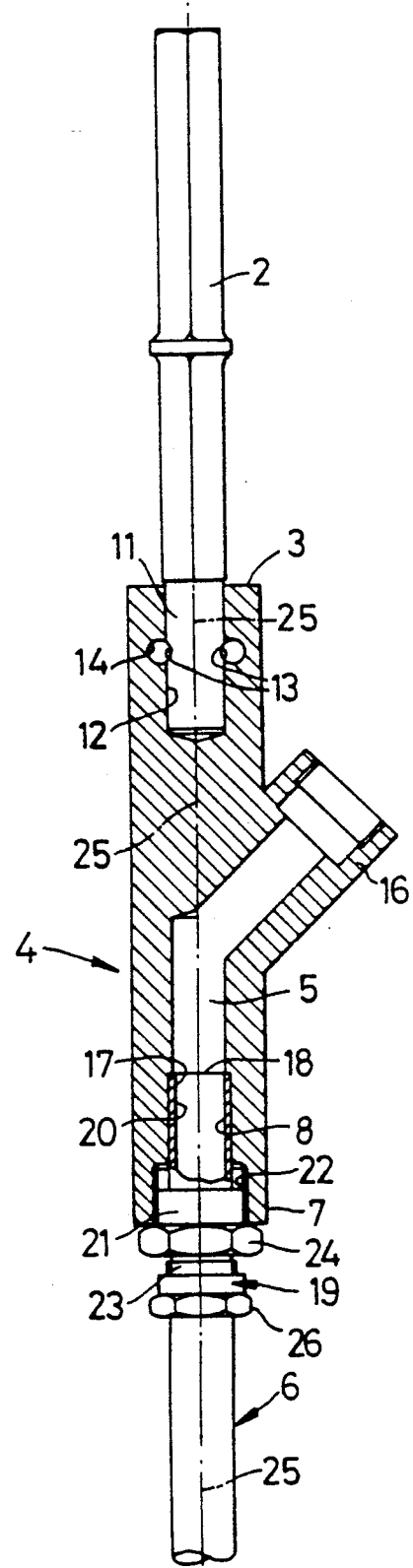
Fig. 1   Fig. 2   Fig. 3   Fig. 4

SUBSOIL TREATMENT APPARATUS

This invention relates to subsoil treatment apparatus of the kind comprising a hollow spike adapted to penetrate the soil to a selected depth and for compressed air to be discharged from an aperture at a lower end of the spike to break up, loosen and aerate compacted subsoil.

Such apparatus is used for improving subsoil drainage e.g., beneath sports pitches, for improving gorwing conditions e.g., adjacent the roots of a tree, bush etc, and is also known for introducing into the subsoil fertiliser, root treatment chemicals etc, using the compressed air as a carrier gas.

However, with current equipment, difficulties are frequently encountered in driving the spike into the ground either at all, or at an economical rate, particularly in relatively large areas such as sports grounds.

According to a first aspect of the invention, there is provided subsoil treatment apparatus comprising: an impact striking head associated with one end of an impact transmission block which has an internal chamber connectable to a source of compressed air, and a hollow, tubular, ground-piercing spike projecting from an opposite end of the block and to which impacts are transmitted from the block, the end of the spike associated with the block being in air flow communication with the chamber, and the opposite end of the spike being provided with at least one air discharge aperture.

With the impact striking head provided at what, in use, is an upper end of the block, ready access to the head is provided for power means, such as an hydraulic or pneumatic hammer, to be brought into engagement with the head for rapid, powered driving of the spike into the ground.

Although the striking head and the block can be formed integrally, separate components are preferred, whereby should an impact head become damaged and require refurbishment or replacement, it may be removed from the block, as the latter would normally remain servicable. In detail, an upper end of the transmission block may be provided with a blind socket having an impact base, to receive, in abutting relationship, a lower end of an elongate chisel-like impact head of suitable quality steel. The imapct head may be releasably retained with respect to the block by the inserted end of the head being provided with a recess or groove and with the block provided with a laterally extending hole(s) intersecting the blind socket, whereby a knock-in, knock-out pin or staple may engage the recess or groove.

The block is preferably provided with an internally threaded socket to receive a screw-in end fitting of an air line, the socket being open to the chamber.

At its lower end, the block may have an impact annulus against which an inner end of the spike abuts, while the spike may be releasably attached to the block by a doubly threaded fitting having a smooth internal bore through which the spike end portion may pass and comprising a first threaded portion adapted to screw into a threaded aperture in the block, and a second threaded portion separated from the first be hexagon flats, the arrangement being such that the impact head, the transmission block and the spike are all located on a common impact axis. Onto the second threaded portion a hexagon retaining nut is adapted to be screwed, with an interposed olive sealing ring to clamp the external periphery of the spike, and hence to secure the spike releasably to the block, as clearly, the spike could also become damaged and require repair or replacement.

At its other, and in use lower, end, the spike preferably terminates in a pointed, solid hardened steel tip, to aid ground penetration, while adjacent the tip preferably three air discharge apertures located 120° apart are provided, each aperture preferably being constituted by an elongate slot.

According to a second aspect of the invention, there is provided subsoil treatment apparatus comprising a mobile chassis, a plurality of apparatus in accordance with the first aspect mounted on the chassis for simultaneous multiple ground penetration, power means for impact striking the heads, and an air compressor.

The chassis may be a self-propelled vehiclle, such as a pick-up truck, or an agricultural tractor, or a JCB type vehicle; or alternatively may be a tractor or vehicle hauled trailer. In one embodiment three sets of apparatus in accordance with the first aspect, and hence three spikes, could be provided, adapted to overhang the rear of the chassis and to be displaceable from a retracted, transport position, to an operational position. Although displacement could be by hand it is preferably effected by power means, such as a double-acting hydraulic ram. In order that the chassis avoids re-compacting, or further compacting, the subsoil, it is preferably provided with relatively wide tyres, to minimise localised ground loading.

In the case of a pick-up truck a power generating means such as a diesel engine needs to be provided (adapted to drive an hydraulic pump), but in the case of a diesel engine driven agricultural tractor or JCB type vehicle, an hydraulic pump may already be present for other functions in which case, additional valving and hoses will transmit hydraulic power to the hydraulic hammer(s). Preferably, individual hydraulic hammers, e.g. three, one to engage each impact head, while another power take-off from the primer mover also drives an air compressor.

Preferably, further power means e.g., an hydraulic ram, is also provided for withdrawing individual spikes, or groups of spikes, from the ground, after penetration and compressed air injection.

Whilst the depth of spike penetration required, and the air pressure required will vary for different sub-soils and different degrees of compaction, it is envisaged that penetration to 1-3 ft and pressures of 15-30 bar will satisfy even the most difficult conditions. Also, in multiple arrangements of apparatus in accordance with the second aspect, the mutual spacing of the apparatus depends to some extent on the soil type and its compaction i.e., closer spacing may be required for difficult conditions than would be required for easy conditions.

For treating large areas, a trailer provided for example with twelve spikes arranged in rank and file may be provided. The trailer may be multi-wheeled or track laying to minimise localised ground loading. Such a trailer may be towed by a pick up or agricultural tractor, it merely being required to ensure that the prime mover has sufficient power to generate sufficient hydraulic pressure and compressed air.

The compressed air is not of course applied until spike penetration to the required depth has been achieved, and depending on the power available from the prime mover, the latter may be used first to generate hydraulic power, after completion of penetration, to generate the compressed air. Alternatively if sufficient power is available, compressed air may be generated during penetration and stored in an accumulator for controlled release to successive spikes, or successive groups of spikes, or to all the spikes simultaneously. With the latter, all the spikes can then be withdrawn and the vehicle rapidly moved to the next location.

As indicated previously, the vehicle could also advantageously be provided with ancillary equipment such as storage tanks and control valves e.g., of the solenoid type.

The invention will now be described in greater detail, by way of example, with reference to the accompanying drawings, in which:

FIG. 1 is a front elevation of a subsoil treatment apparatus in accordance with the first aspect of the invention;

FIG. 2 is a front elevation of the complete spike adapted to be fitted to the apparatus of FIG. 4;

FIG. 3 is a section on the line III—III of FIG. 2;

FIG. 4 is a section on the line IV—IV of FIG. 1;

Figure 5:
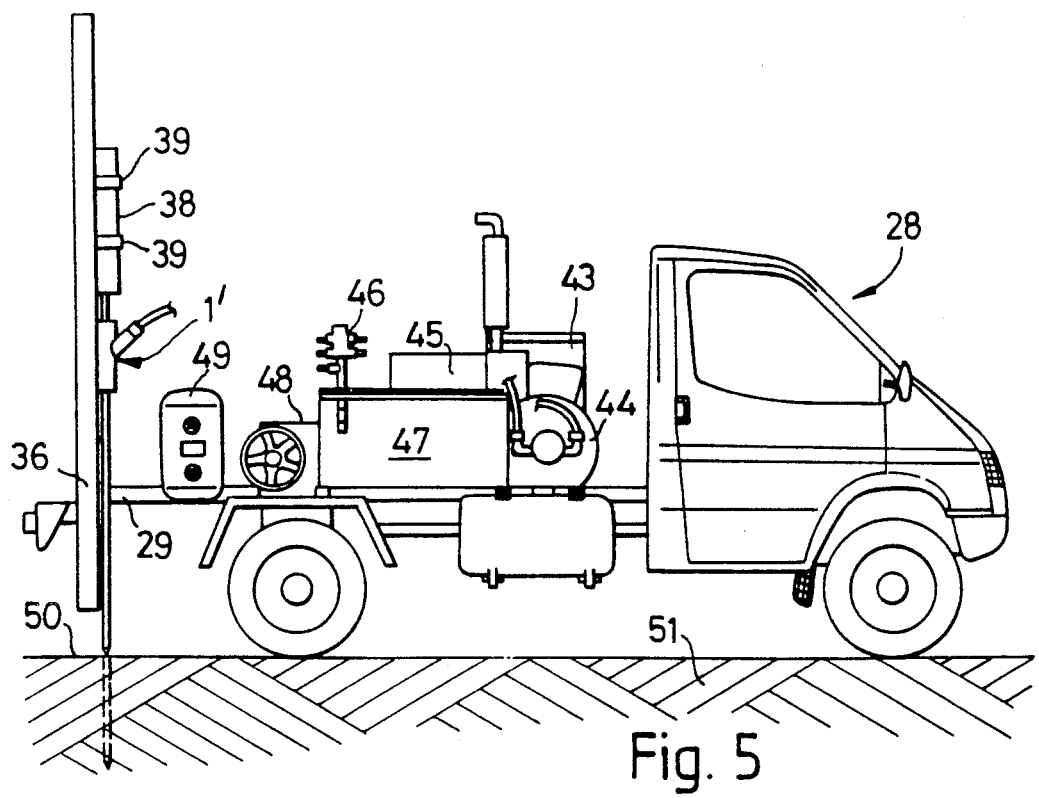
FIG. 5 is a side elevation of a truck provided with three sets of apparatus of FIGS. 1-4.

In the drawings, subsoil treatment apparatus 1 comprises an impact striking head 2 associated with one end 3 of an impact transmission block 4 which has an internal chamber 5 connectable to a source (not shown) of compressed air. A hollow, tubular, ground-piercing spike 6 projects from the opposite end 7 of the block 4 and to which spike 6 impacts are transmitted from the block 4. As can be appreciated from FIG. 4, the end 8 of the spike 6 is in air flow communication with the chamber 5, while as can be appreciated from FIGS. 2 and 3 the opposite end 9 of the spike 6 is provided with three, elongately slotted, air discharge apertures 10, located 120° apart.

In detail, the striking head 2 may be chisel-like of suitable quality steel, with a lower end 11 of the head 2 engaged in a blind socket 12 in what, in use, is the upper end of the block 4. The head 2 is releasably retained with respect to the block 4 by providing the lower end 11 with a pair of diametrically opposite grooves 13, and providing the block 4 with holes 14 intersecting the grooves 13, to receive a pair of knock-in, knock-out pins 15.

In order to provide an air supply to the chamber 5 from a remotely located air compressor, the block 4 is provided with an internally threaded socket 16 to receive a screw-in end fitting (not shown) of an air line, the socket 16 being open to the chamber 5.

At the lower end 7 of the block, an impact annulus 17 is provided by counter boring the block 4, against which impact annulus 17, an inner end 18 of the spike 6 abuts. The spike 6 is releasably attached to the block 4 by a doubly threaded fitting 19 having a smooth internal bore through which the spike end portion 20 may pass, and comprising a first threaded portion 21 adapted to screw into a threaded aperture 22 of the block 4, and a second threaded portion 23 separated from the first 21 by hexagon flats 24, the arrangement being such that the head 2, the block 4 and the spike 6 are all located on a common impact axis 25. Onto the second threaded portion 23 is screwed a retaining nut 26 with an interposed olive sealing ring (not shown) to clamp the external periphery of the spike 6 and hence to secure the spike 6 releasably to the block 4.

Also as illustrated in FIG. 3, the end 9 of the spike terminates in a pointed, solid tip 27 of hardened steel.

Figure 6:
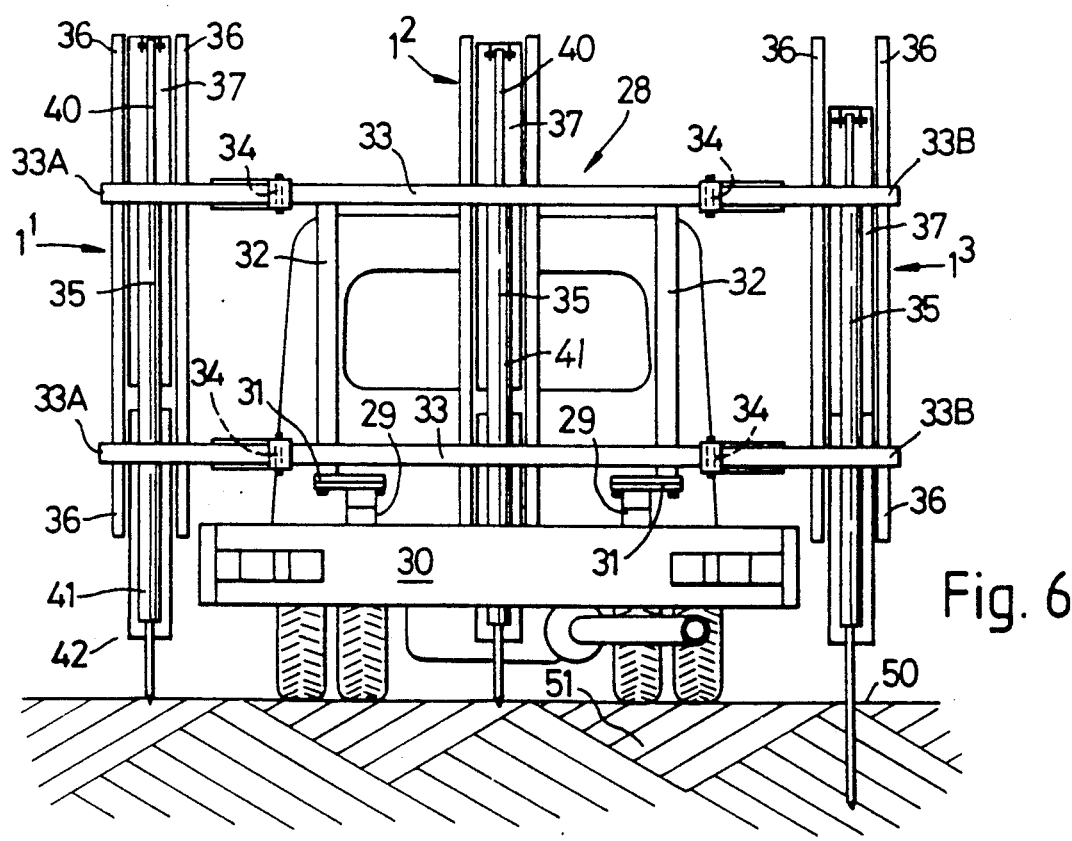
FIG. 6 is a rear view of FIG. 5.

In FIGS. 5 and 6 is illustrated a truck 28, but for clarity all hydraulic hoses and air lines have been omitted. The truck's chassis is provided with a pair of spaced-apart channel bearer beams 29 welded to a common cross beam 30 (other cross beams are not visible). Seated on the beams 29 are a pair of bearer plates 31 to which are welded lower ends of two upright, spaced apart and parallel beams 32, across upper and lower ends of which are welded upper and lower cross beams 33 to form a basic, rectangular support structure. Each end of each cross beam 33 extends beyond its adjacent upright beam 32 and carries a pivot pin 34 for upper and lower continuation cross beams 33A and 33B respectively. A first apparatus $1^1$ is carried by the cross beams 33, a second apparatus $1^2$ by the continuation beams 33A, to 33B to the left hand side of FIG. 6, and a third apparatus $1^3$ by the continuation beams 33A, 33B to the right hand side of FIG. 6, with the pivot pins 34 providing the capability for folding the continuation beams 33A, 33B from their deploy position illustrated in FIGS. 5 and 6 to an inboard, transportation position. Conveniently the beams 32, 33, 33A and 33B are of hollow, square section steel.

As best seen in FIG. 6, each apparatus is vertically slidable under the control of an hydraulic ram 35. In detail, a pair of mutually facing, channel section guide rails 36 with an interposed slider 37 are provided. The beams 36 are welded across the cross beams 33, or respectively the continuation beams 33A, 33B. An industry-standard hydraulic hammer 38 is rigidly attached to each slider 37 by upper and lower collars 39, with the upper end of each chisel-like impact head 2 fitted into its hammer. Piston rods 40 of the rams 35 are attached to the upper end of their associated slider 37, while cylinder 41 of each ram is anchored to an elongate support structure 42 welded to, and depending downwardly from, the lower cross beam 33 or repsectively continuation cross beams 33B. In FIG. 6, the apparatus $1^1$ and $1^2$ have their piston rods 40 extended while $1^3$ has its piston rod retracted.

The truck chassis also carries a diesel engine 43 to drive an hydraulic pump 44 and an air compressor 45. A bank of control valves 46 are mounted on hydraulic oil tank 47 which has a coller 48, while the compressor supplies three compressed air tanks or bottles 49. Elements 43–49 are omitted from FIG. 6 for clarity.

In operation, with the diesel engine 43 running and hydraulic power and compressed air available, the rams 35 are retracted to bring the spike tips 27 into engagement with surface 50. The hammers 38 are then activated to drive the spikes 6 into subsoil 51 e.g. to a depth of 3 ft (circa 1 m) whereupon the air bottles 49 are connected to the spikes 6 resulting in air discharge from the apertures 10 and hence loosening etc of the subsoil 50. Prevailing conditions and experience will dictate the quantity of air discharged and the distance between the last set of three holes and the next set. To retract the spikes from the ground the rams 35 are extended and the truck 28 advanced to its new location ready for repeat operation.

What we claim is:

1. Subsoil treatment apparatus comprising an impact transmission block, an impact striking head associated with one end of said block; an internal chamber provided in said block and connectable to a source of compressed air; and a hollow, tubular, ground-piercing spike projecting from an opposite end of said block and to which impacts are transmitted from said block, the end of the spike associated with said block being in air flow communication with said chamber, and at least one air discharge aperture provided at an opposite end of said spike, said striking head and said block being formed as separate components, and an upper end of said transmission block being provided with a blind socket having an impact base, to receive in abutting relationship, a lower, inserted end of said striking head, said striking head comprising an elongate chisel-like impact head of suitable quality steel.

2. Apparatus as claimed in claim 1, wherein said impact head is releasably retained with respect to said block by an inserted end of said impact head being provided with a groove and with the block provided with laterally extending holes intersecting said blind socket, with a knock-in, knock-out staple engaging said groove.

3. Apparatus as claimed in claim 1, wherein an internally threaded socket is provided in said block to receive a screw-in end fitting of an air line, said socket being open to said chamber.

4. Apparatus as claimed in claim 1, wherein an impact annulus is provided at said opposite end of said block against which annulus an inner end of said spike abuts.

5. Apparatus as claimed in claim 1, wherein said spike is releasably attached to said block.

6. Apparatus as claimed in claim 1, wherein said opposite end of said spike terminates in a pointed, solid, hardened steel tip.

7. Apparatus as claimed in claim 1, wherein three air discharge apertures located 120° apart are provided at said opposite end of said spike.

8. Apparatus as claimed in claim 7, wherein each of said apertures is constituted by an elongate slot.

9. Apparatus as claimed in claim 7, wherein said apertures are located adjacent a pointed, solid, hardened steel tip in which said spike terminates.

10. Subsoil treatment apparatus comprising an impact transmission block, an impact striking head associated with one end of said block; an internal chamber provided in said block and connectable to a source of compressed air; and a hollow, tubular, ground-piercing spike projecting from an opposite end of said blockd and to which impacts are transmitted from said block, the end of the spike associated with said block being in air flow communication with said chamber, and at least one air discharge aperture provided at an opposite end of said spike, wherein said spike is releasably attached to said block, and said releasable attachment is by a doubly threaded fitting having a smooth internal bore through which an end portion of said spike passes and comprising a first threaded portion adapted to screw into a threaded aperture in said block, and a second threaded portion separated from said first by hexagon flats, the arrangement being such that said impact head, said impact transmission block and said spike are all located on a common impaxt axis.

11. Apparatus as claimed in claim 10, wherein a hexagon retaining nut is adapted to be screwed onto said second threaded portion to clamp against the external periphery of said spike.

12. A mobile chassis carrying a plurality of subsoil treatment apparatus, each said apparatus comprising an impact transmission block, an impact striking head associated with one end of said block; an internal chamber provided in said block and connectable to a source of compressed air; and a hollow, tubular, ground-piercing spike projecting from an opposite end of said block and to which impacts are transmitted from said block, the end of the spike associated with said block being an air flow communication with said chamber, and at least one air discharge aperture provided at an opposite end of said spike, said plurality of apparatus being mounted on said chassis for simultaneous multiple ground penetration, said chassis being further provided with power means for impact striking said heads, and also an air compressor, wherein said striking head and said block are formed as separate components and an upper end of said block is provided with a blind socket having an impact base, to receive, in abutting relationship, a lower, inserted end of said striking head, said striking head comprises an elongate chisel-like impact head of suitable quality steel.

13. Apparatus as claimed in claim 12, wherein the chassis is a self-propelled vehicle.

14. Apparatus as claimed in claim 13, wherein said vehicle is a pick-up truck and said power generating means comprises a diesel engine adapted to drive an hydraulic pump.

15. Apparatus as claimed in claim 14, comprising individual hydraulic hammers for each of said striking heads.

16. Apparatus as claimed in claim 14, wherein said diesel engine also drives said air compressor.

17. Apparatus as claimed in claim 12, wherein three sets of said subsoil treatment apparatus are provided and are adapted to overhang a rear of said chassis, with at least some of said apparatus being displaceable from a retracted, transport position, to an operational position.

18. Apparatus as claimed in claim 12, comprising power means for withdrawing said spikes from said ground after penetration and compressed air injection.

* * * * *